April 14, 1931.  M. L. BAYARD ET AL  1,800,979
TRACTOR BELT DRIVE
Filed Feb. 16, 1927  3 Sheets-Sheet 1
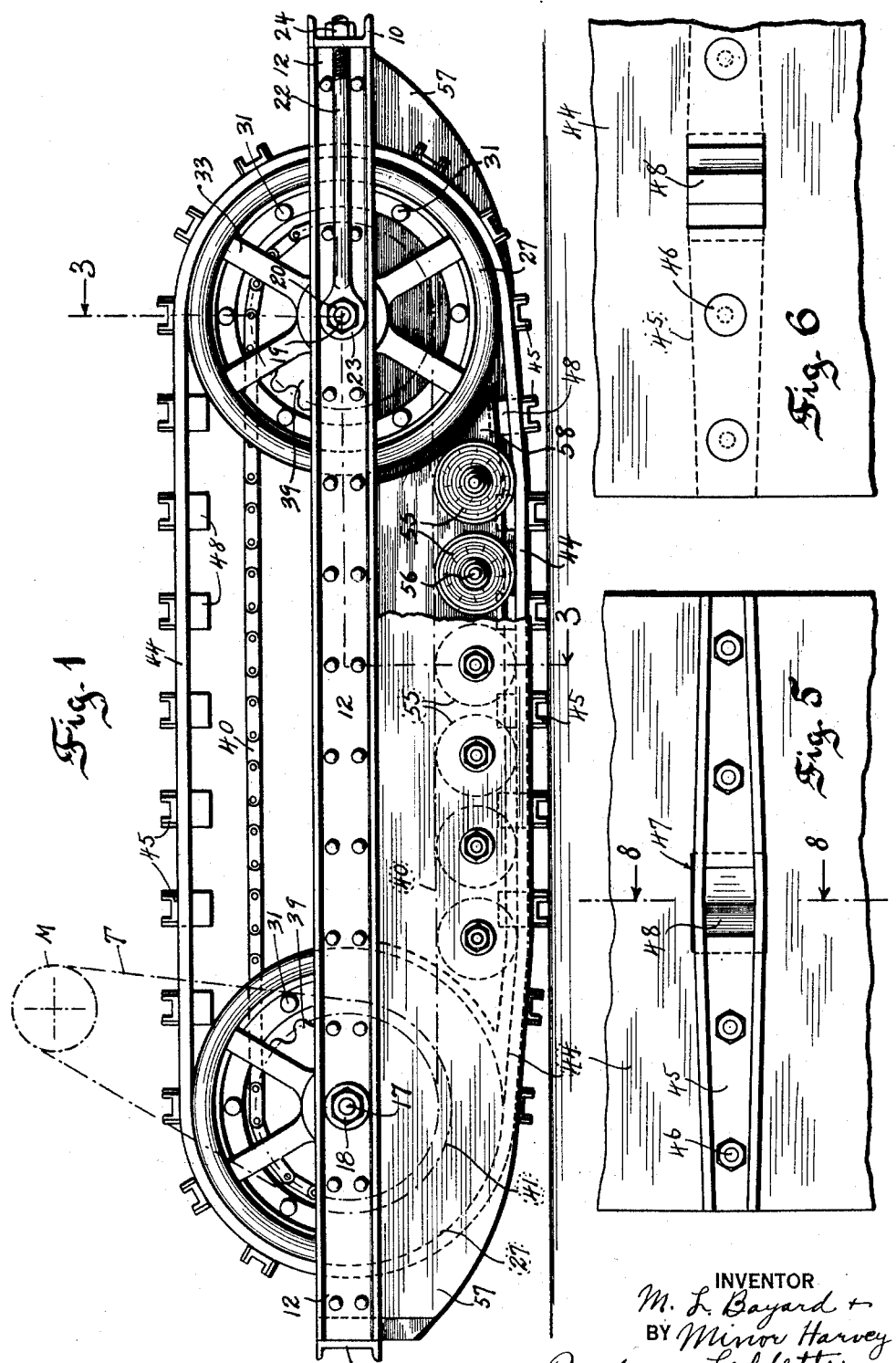

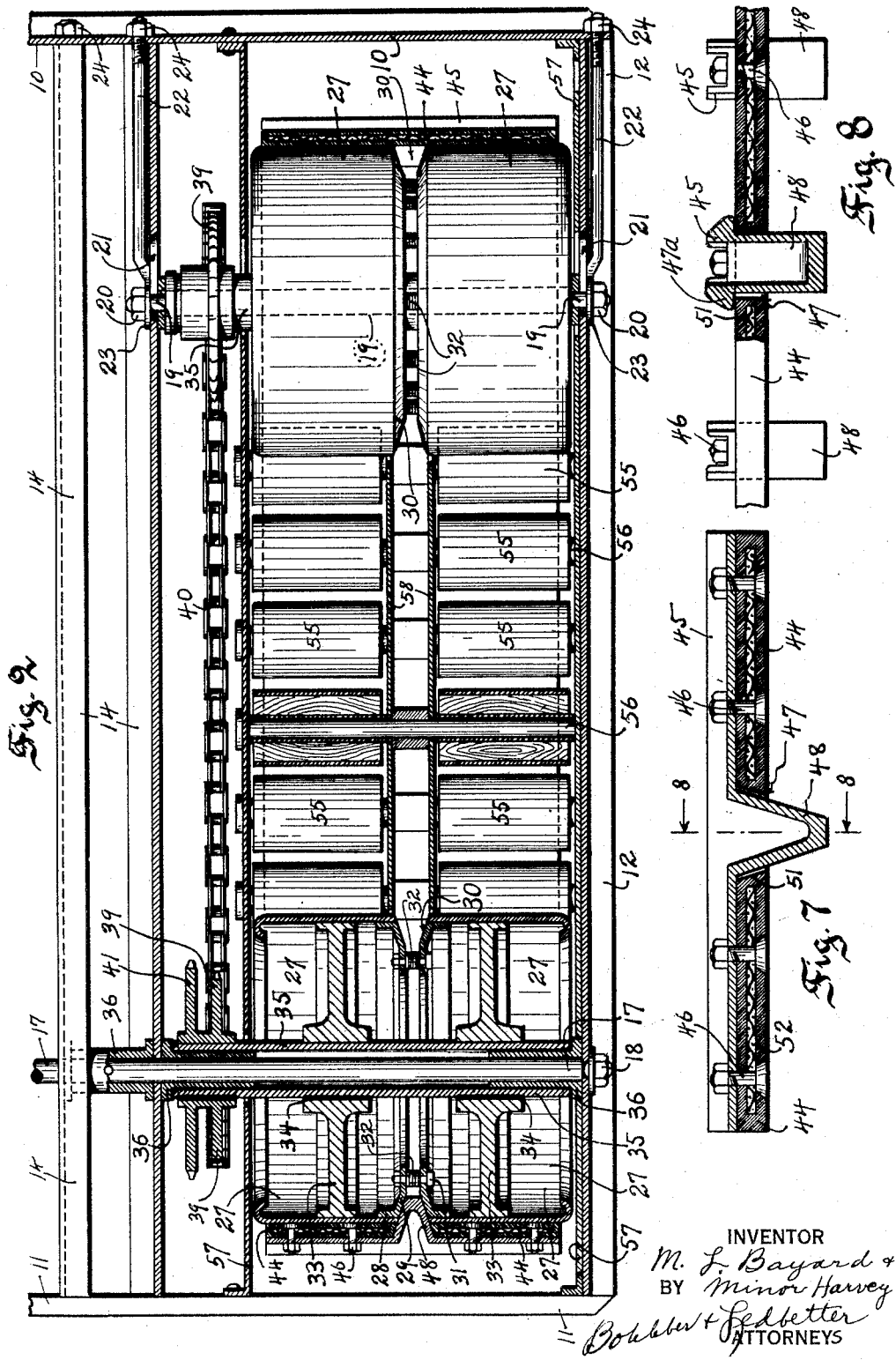

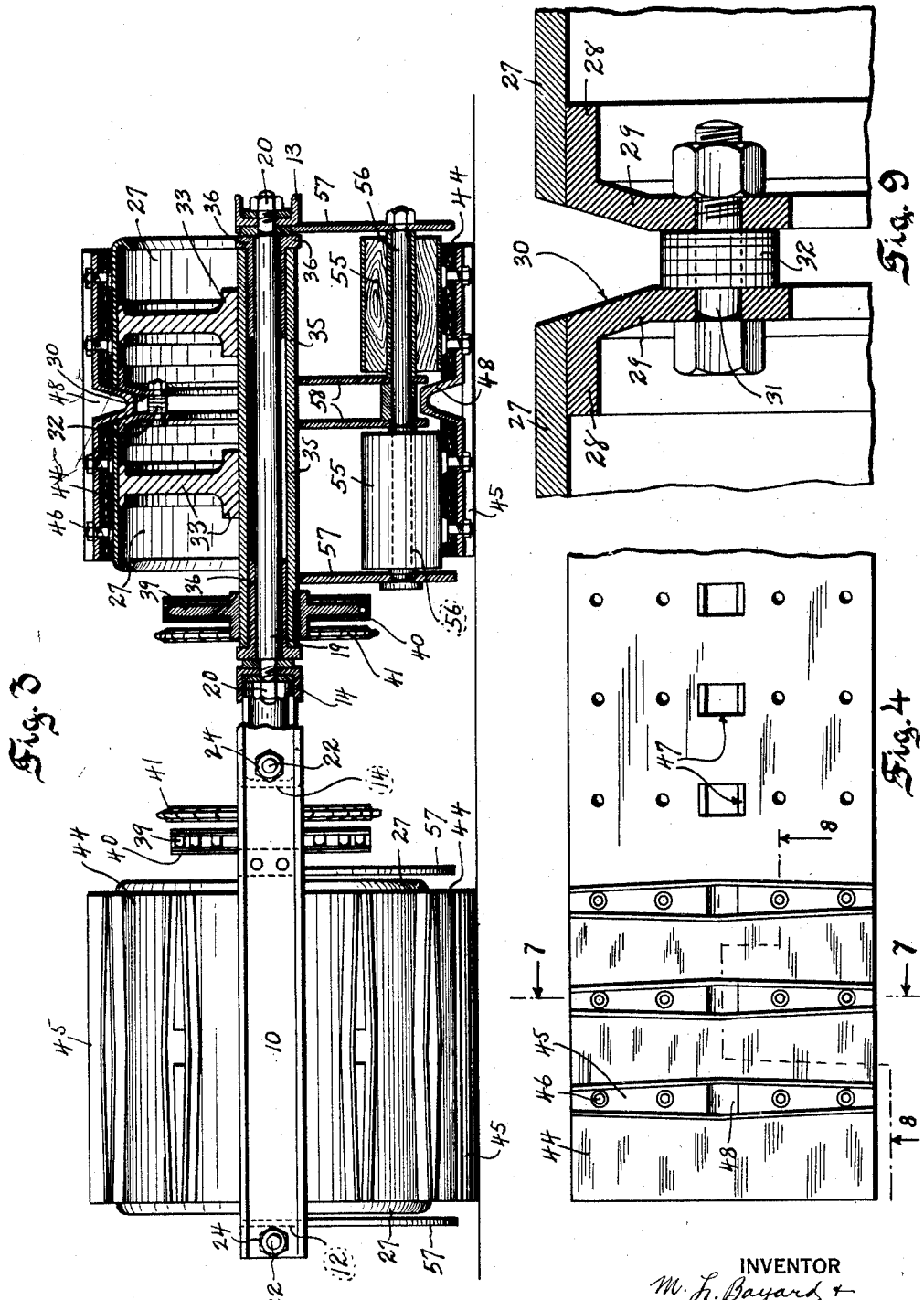

Patented Apr. 14, 1931

1,800,979

UNITED STATES PATENT OFFICE

MORRIS L. BAYARD AND MINOR HARVEY, OF PHILADELPHIA, PENNSYLVANIA, ASSIGNORS TO THE BLAISDELL FILTRATION COMPANY, OF NEW YORK, N. Y., A CORPORATION OF DELAWARE

TRACTOR-BELT DRIVE

Application filed February 16, 1927. Serial No. 168,497.

This invention relates broadly to filter cleaning machinery and more particularly to a track laying belt-tread drive for tractors, the main object being to produce a positively driven belt-tread for a tractor sand washer.

It has been proposed to produce a belt-tread for tractor sand washers wherein the belt was driven as a chain, i. e. teeth registering in apertures were provided between a tractor driving wheel and the belt-tread, but difficulty was experienced by reason of the fact that the belt-tread stretched and became loose in service, and upon tightening it, the teeth and apertures would not properly mesh or register. The present invention seeks to overcome this difficulty by providing a friction groove and friction lugs registering therein so that a belt, when it stretches after use, may be tightened and the cooperating friction groove and friction lugs carried with the belt continue to register and afford traction between each other under all conditions.

A main object of the invention is to produce a positive belt-tread drive for tractor sand-washers so that the gelatinous mud and slick slime or silt in which the machine crawls will not cause slipping and failure to drive between the tractor wheels and the belt-tread; and it is also an object to provide means to keep the filter bed slime out of the friction-drive means in the wheel and belt.

A further object is to produce an adjustable belt-tread drive for motor driven tractor sand washers for use in connection with cleaning filter beds so that the machine may be positively driven or propelled over the slime and soft mud deposit on a filter bed surface. To this end and for these purposes, we provide a cooperating groove and wedge-block drive having adjustment means to vary or regulate the degree of friction imposed between the groove and belt wedge-block; and we also provide a belt tension adjustment by which the belt is tightened or loosened to vary or regulate the pressure imposed on the wedge-block to seat them in the adjustable friction groove. These two adjustments cooperate to afford effective means in properly regulating the friction-drive when the machine is first set up and are resorted to for readjustment from time to time to maintain the friction-drive in proper working trim.

In some sand washing machines for cleaning filter beds, motor driven tractor sand washers including a belt-tread drive are used to propel the sand cleaning appliances or sand stirring water ejecting nozzle teeth through the sand to extract or wash the mud and silt therefrom ordinarily collected in the operation of filtering water for public use. A substantial amount of power and ground traction is required to force the sand cleaning teeth thru the packed wall of sand and so considerable difficulty is met with by reason of the fact that the mud over which the machine travels is soft and thoroughly diluted with water and contains a gelatinous matter so that it forms a lubricating medium tending to make the drive wheels slip in the belt-tread, but our invention overcomes that difficulty. The thin slime and gelatinous matter acts as a lubricant and would very soon work its way in between the face of the drive wheel and belt and it would very soon become difficult to secure traction between the drive wheel and belt if it were not for the fact that we provide against that difficulty. Heretofore the wheels slipped in the belt thereby causing the belt to remain stationary on the mud surface thus failing to propel the sand washing teeth through the solid packed sand wall below the mud film, but this friction-drive is positive to propel the belt.

Washing sand in position under the slime layer and under water without removing the water from the filter bed and without unduly disturbing the sand is a difficult undertaking since the machine rests on the slime layer but works in the hard packed sand therebeneath. In this invention we have finally attained a drive that will propel the sand washing water ejecting teeth thru the solid sand bed or wall beneath the slime layer.

It is desirable, in sand washing machines working over a slime mud surface, to employ a smooth and solid or continuous surface belt to prevent entry of slime to the surface of the wheels and also to afford a substantially large supporting surface upon the mud surface so as to carry the weight of the machine and for that reason this invention provides a positive drive for a flexible belt of the rubber or fabric type without holes or other openings in the belt.

In overcoming the difficulties, some of which have been touched upon as above, this invention includes among other things instrumentalities to gain traction between a driven wheel and the inside face of the belt without resorting to a tooth and chain-like drive, and in avoiding that construction no difficulty is encountered by way of non-registering teeth such as is encountered in a belt drive in the form of chain-like means when the belt is readjusted by tightening it.

It is also an object to produce a friction driven belt-tread which tracks or pulls from either end of the machine. For this purpose a mechanical transmission, such as a chain and sprocket set, is sometimes used to supplement and aid the friction-drive. The chain drive connects the two spaced wheels over which the belt-tread rolls so that regardless of whether the sand washer travels ahead or backs up, the result is an initial tractive effort applied to that end of the washer which is ahead. Furthermore the chain drive is an aid in turning since the washer turns in its own length by twisting about which is effected by slowing up or stopping one belt-tread and propelling from the other belt, the latter being placed under more strain or tension at this time is aided by the chain drive transmission.

With the above and other objects in view the invention has relation to an example of construction shown in the accompanying drawings in which the principle of our invention is illustrated.

Figure 1 is a general side elevation of a tractor carriage or running gear embodying the invention, i. e. including the novel tractor drive mechanism.

Figure 2 shows a general plan view of one side of the machine, i. e. one belt-tread and wheel unit, the companion unit or other similar side being removed. A part of the machine is in plan section to disclose the axle and drive means.

Figure 3 illustrates an end view, say the front end, (the right side of Figure 1) of the entire tractor carriage, i. e. the two belt-tread units disposed in spaced relation. The right side of Figure 3 is a cross-section taken on the lines 3—3 of Figure 1 while the left side is a front elevation. The upper portion of the right side is a cross-section through the wheel but the lower portion is a cross-section taken to the rear of the wheel.

Figure 4 shows a plan view of a lengthwise fragment of the belt with several driving cleat bars carrying the lugs or wedge-blocks anchored thereto, the surface of the belt shown being that side which rests upon the ground or slime and mud surface of a filter bed over which the tractor crawls.

Figure 5 illustrates an enlarged fragmentary outer plan view of the belt also showing the same side as in Figure 4.

Figure 6 is a fragmentary view of the other side of the belt, i. e. the side which rolls against a drive wheel.

Figure 7 shows a transverse section of the belt taken on the line 7—7 of Figure 4 through one of the cleat bar treads and friction drive wedge-blocks.

Figure 8 is a fragmentary longitudinal section of the belt taken on the line 8—8 of Figure 4, showing part of the belt in edge elevation, and a part in longitudinal section.

The foregoing belt views emphasize the fact that the belt holes, through which the wedge-blocks project, are in fact closed by the wedge-blocks so that slime may not be pumped or forced into the belt through these holes as the machine crawls over a water covered slime layer resting on the sand bed.

Figure 9 is an enlarged fragmentary detail of the adjacent portions of a drive wheel preferably made in two sections including a friction-drive groove therebetween with means to adjust the distance between the wheel sections and hence the width of the friction groove by which the tractive effort is increased or decreased between the driving wheel and belt tread as already suggested as one of the features of the invention.

Unlike the usual form of tractor which travels over the ground, the present tractor is designed to crawl upon and propel itself over a soft mud or silt bed composed of fine dirt and gelatinous matter which is known around filtration plants as schmutzdecke. This gelatinous mass over which a tractor sand washer must operate presents many difficulties because its tendency is to work its way in between the drive wheels and inside of the belt thereby lubricating the wheel and belt surfaces causing the wheel to slip in the belt and failure of the tractor to propel itself. The present invention overcomes the difficulties and affords a positive propulsion in the way of a track laying drive for tractors which is durable and efficient.

As already mentioned, Figure 3 shows a front view of the tractor carriage comprising two main belt tread units, i. e., both sides of the machine, but in describing an example of the invention, reference is more particularly had to one of the units, since the two sides of the tractor carriage are the same in construction except for the provision of a long axle at one end of the carriage or chassis and two short axles at the other end as will be described.

A rectangular steel frame, comprising end pieces 10 and 11 and outside frame pieces 12 and 13, is provided. Inside parallel frame pieces 14 complete the main frame chassis or carriage structure and one belt tread drive unit is mounted between the parallel frame pieces 12 and 14 while another unit is disposed between the frame pieces 14 and 13. This main frame also carries the engine and other parts not related to this belt-tread improvement and which are therefore omitted.

A long axle 17 at one end of the carriage frame runs transversely of the outer frame pieces 12 and 13 and is anchored by a nut 18 on each end of the axle, thus securely fixing the axle 17 in the frame. The one axle 17 therefore carries both tractor wheels at one end of the carriage. A pair of shorter axles 19 are carried in the other end of the frame, the ends of the axles 19 being slidably confined in slots 21 in the frame 12—14 for movement and adjustment in relation to the frame. Adjustable draw rods 22 have their inner ends formed with an eye 23 disposed upon the ends of each axle 19 and a nut 20 secures each draw rod to the respective axles 19. The outer end of the draw rods 22 are passed through the end frame piece 10 and are provided with an adjusting nut 24 by which the axle 19 may be adjusted back and forth in the slots 21 and maintained parallel to the first named non-adjustable axle 17 and so as to adjust the tension on a belt tread to be described and to thereby regulate the pressure imposed on the friction wedge-blocks to seat them in a friction groove to be described.

A tractor drive wheel 27 is mounted to roll on each axle 17 and 19 between the frame unit 12—14 and frame unit 13—14. Each drive wheel comprises spaced wheel sections 27, the inner adjacent edges of which define a friction drive groove 30 formed centrally around each wheel 27. The inner edge of each wheel section may be lined or reinforced by a ring 28. Each ring 28 has an angularly formed flange 29 disposed at an angle to the vertical or wheel radius thereby defining the friction drive groove 30 including inwardly diverging walls 29 thus forming a V-shaped wedge-block friction drive groove 30 which is adjustable for width as will be described. The groove flange 29 is of metal thereby affording a metal to metal friction grip as will be explained.

Bolts 31 carrying spacing means such as a ferrule or washers or shim means 32 hold the wheel sections 27 in rigidly spaced relation to define the friction groove 30. The spacing means 32 may to advantage be formed of washers 32 having different thicknesses so that by selection of the proper thickness washers, the width of the V-shaped groove 30 may be adjusted. The adjustment of the width of groove 30 may be effected by removing a washer 32 or inserting washers between the two wheel sections on the bolt 31 so as to properly adjust the spaced relation of the two wheel sections 27. A ferrule may be used between the wheel section flanges 29 if the adjustment washers 32 are not desired. Each wheel section 27 is provided with a suitable hub and spoke structure 33 by which the wheel sections are fixed by a key 34 or other means upon a hollow drive shaft 35. A drive tube shaft 35 rotates upon a pair of bushings 36 carried on each end of both of the axles 17 and 19.

Suitable drive transmission means connect the two drive wheels 27 at each end of the carriage within the respective frame units 12—14 and 13—14 so they may uniformly drive and pull together. To this end the axle 17 and each axle 19 carry a sprocket 39 fixed on the drive tubes 35 and a chain 40 travels on the two respective sprockets 39 by which the two pairs of spaced tractor wheels 27 at each end of the frame are uniformly driven, the two sprockets 39 being of the same size for this purpose. A motor driven sprocket 41 is also anchored to the drive tube 35 to drive the chain 40 and both wheels 27. Any suitable motor means M and transmission T, as in Figure 1 diagrammatically, may be employed to drive the tractor by direct connection with the sprocket 41. In this way, the motor M drives through sprocket 41 to both of the hollow shafts 35 to thereby positively drive the two wheels mounted in the respective tractor frame units to both drive wheels 27 at each end of each frame unit so that four traction wheels are employed.

A tractor belt-tread 44 is mounted to travel on the two spaced tractor wheels 27, the belt being sufficiently wide to span both sections 27 forming one wheel. The belt is made of any suitable flexible material, as for example rubberized fabric, and the tension of the belt may be adjusted by running the nuts 24 up on the draw rods 22 to longitudinally slide the respective axles 19 in the frame. The belt 44 carries a plurality of traction cleat bars 45 secured to the outside thereof as by bolts 46. A perforation 47 is formed through the belt for the reception of a friction wedge-block lug or friction drive tooth 48 adapted to frictionally engage the friction drive groove 30 in the wheel 27. The wheel groove 30 is adjusted to receive the V-shaped wedge-block 48 so that this wedge drive block and wedge-groove fit tightly together with sufficient friction to prevent slipping movement relatively between the belt and the wheels. The traction cleat bars 45 are suitably spaced apart and include upstanding ribs which crawl in the mud surface of the filter bed to establish driving traction therewith. The cleat bars 45 extend across the belt from edge to edge thereof.

The belt perforations 47 are preferably vulcanized or sealed with a rubber film 51 so as to prevent the ingress of water into the inside fabric core 52 of the belt 44. In this way the belt is sealed against moisture at the point where the wedge-block 48 projects through the belt and the belt is made durable despite the perforations made therein. What is of further importance is that the belt perforations 47 are closed by the spread of the cleat bar 45 and wedge-block 48 as indicated at 47a Figure 8 so that mud and silt cannot be squeezed and pumped into and through the belt as the belt progresses and flexes up and down over the sand bed. Thus the inner face of the belt and wheel groove remain comparatively clean. The wedge-blocks 48 themselves, while hollow for lightness, present a closed structure to prevent the mud from entering the belt.

A plurality of belt supporting idle rollers 55 run in engagement with the inside surface of the lower portion of the belt between the two drive wheels 27 in the respective frame units. The rollers 55 are carried on axles 56 anchored at each end to side plates 57 and pass through central plates 58. The outer plates 57 aid in preventing accumulation of mud on the inside working surface of the belt and extend from end to end of the carriage frame to strengthen the construction thereof. There is provided one row of rollers 55 for each wheel section 27. In this way two rollers 55 are carried upon one axle 56, the rollers being spaced apart by the inner frame plates 58 so as to afford free passage of the wedge drive blocks 48 between the rollers 55. The parallel mud guard frame plates 57 and inside roller supporting plates 58 carry the weight of the machine and evenly distribute it to the rollers 55 thereby holding the belt straight and flat upon the surface over which the carriage travels.

The lower edges of the mud guard plates 57 are disposed proximate the belt-tread edges. In fact the lower edges of the mud guards extend below the upper surface of the belt-tread and are carefully positioned in a plane just short of touching the mud surface. This arrangement prevents the slime from squeezing in and running over the belt edge to any objectionable degree. Especially in turning, the mud guard plates 57 prevent the slime from pouring over the belt edges.

While the cooperating friction wedge-block 48 and friction drive groove 30 guide the belt in continuous movement upon the drive wheels 27, the wedge-block and groove also and more particularly act to positively drive the flexible belt-tread from the wheels despite the fact that some mud and silt, which has soft gelatinous lubricating matter therein, may work in and tend to cause the wheels 27 to slip in the belt. The tension of the belt and the weight of the machine force the friction V-shaped wedge-blocks 48 into tight engagement and bottoms them within the V-shaped friction drive groove and since there are a number of wedge-blocks 48 simultaneously engaging the groove 30, it follows that a highly efficient tractive effort is attained between each wheel 27 and each end of the belt so that the belt is driven from each end by reason of the chain and sprocket transmission 39—40.

In view of the fact that propelling a tractor through the soft gelatinous matter or film which prevails on the surface of a filter bed constitutes a special engineering problem in itself, we have sought in this invention to propel the belt at each end and it is found highly efficient in practice. To propel the belt from each end thereof, the chain and sprocket transmission is arranged to uniformly drive the front and rear wheels over which the wedges track in the grooves of the wheels. In turning, the sprocket and chain transmission is of special service and carries a large measure of the excess driving strain imposed on the moving parts. Furthermore, the tractor runs equally well in either direction because it pulls from either and both ends.

In service and after considerable use, a certain amount of filter jelly and mud may travel with the belt between it and the face of the wheel but that matters not since the traction to drive the belt is not dependent upon contact of the inner belt surface upon and with the wheel face but depends more particularly upon the metal to metal contact between the wheel grooves 30 and lug-blocks 48. In this way there is provided a rubber and fabric belt tread but at the same time there is a hard metallic unyielding surface as far as the traction elements are concerned. It may be true that in the prior art there exist tractor belt drives, but there the traction is between the belt surface and wheel whereas in this improvement traction is had through instrumentalities carried with the belt and propulsion of this belt is not effected by friction of the belt surface upon the wheel face but otherwise as fully explained. Furthermore, our belt-tread presents a solid surface to rest upon the filter bed surface and thereby reduces to a minimum the weight per square unit surface resting on the filter bed.

The combination two-element adjustment maintains the belt-tread in positive driving condition. Tension is applied to the belt by the draw rods 22 to seat and bottom the wedge-blocks 48 in the wheel grooves 30 under the proper degree of friction, while the washer spacer adjustment 32 is employed to regulate the depth in which the wedge-blocks are seated. Since the cleat bars 45 extend across the belt, it follows that the pressure exerted on the belt is in fact received by the cleat bars and the strain or pressure which forces the wedge-blocks into the friction groove, is in fact largely removed from the belt.

The wedge-blocks or drive teeth 48 are carried with the bars 45 between the ends thereof and each bar 45 reaches across the belt from side to side and the bars are anchored to the belt at several points as by bolts, rivets or other suitable means. The wedge-block 48 necessarily requires to be forced into the V-shaped groove 30 or to be bottomed or seated therein and also to be pulled out of the grooves. In view of the fact that the bar 45 is anchored to the belt all the way across the face thereof, the pressure or tension across the entire belt is transmitted through the bar to the wedge-block preferably mounted centrally thereof so as to impose the necessary pressure on the wedge-block to seat it in the groove 30 and to remove it thereform as the respective wedge-blocks leave one wheel and start toward the other.

What we claim is:—

1. A belt tread for tractors comprising, an endless fabric-like belt provided with perforations, cleat bars anchored to the belt, and a V-shaped friction block carried by each cleat bar and extending through each perforation.

2. A belt tread comprising, a belt provided with a row of aligned perforations formed centrally therein throughout the belt, a cleat bar for each perforation and anchored transversely on the outer face of the belt and extending across the respective perforations to close the same, and a wedge-block carried by each cleat bar and extending through the respective perforations.

3. A belt tread for tractors comprising, an endless fabric-like belt provided with perforations, cleat bars anchored to the belt and extending across the belt from substantially edge to edge to reinforce the belt, a V-shaped friction block carried by each cleat bar and extending through each perforation and closing the latter, and the cleat bars being adapted to carry and distribute the load to the friction blocks.

In testimony whereof we affix our signatures.

MORRIS L. BAYARD.
MINOR HARVEY.